(12) United States Patent
Jung (10) Patent No.: US 8,006,654 B1
(45) Date of Patent: Aug. 30, 2011

(54) HIGH EFFICIENCY EIGHT STROKE INTERNAL COMBUSTION ENGINE

(76) Inventor: Philip Owen Jung, Mobile, AL (US)

( * ) Notice: Subject to any disclaimer, the term of this patent is extended or adjusted under 35 U.S.C. 154(b) by 0 days.

(21) Appl. No.: 12/878,816

(22) Filed: Sep. 9, 2010

(51) Int. Cl.
*F02B 47/02* (2006.01)
*F01B 29/04* (2006.01)
(52) U.S. Cl. .................. 123/25 C; 123/25 P; 60/712
(58) Field of Classification Search .............. 123/25 C, 123/25 P, 64; 60/712
See application file for complete search history.

(56) References Cited

U.S. PATENT DOCUMENTS

| 4,143,518 A | * | 3/1979 | Kellogg-Smith | ............... 60/712 |
| 4,736,715 A | * | 4/1988 | Larsen | ................... 123/25 C |

FOREIGN PATENT DOCUMENTS

WO WO 2009116741 A2 * 9/2009

* cited by examiner

*Primary Examiner* — Noah Kamen (57) ABSTRACT

A method and a system for operating an eight-stroke internal combustion engine having higher thermal efficiency than a four-stroke engine is disclosed. The strokes comprise intake (FIG. 1), compression (FIG. 2), combustion for a first power stroke (FIG. 3), exhaust (FIG. 4), vapor or water injection for a second power stroke (FIG. 5), exhaust (FIG. 6), vapor injection for a third power stroke (FIG. 7), and exhaust (FIG. 8). Heat from each exhaust is recovered and recycled to a subsequent stroke. Consequently, an engine with much higher thermal efficiency and thus lower fuel consumption is achieved.

18 Claims, 11 Drawing Sheets

HIGH EFFICIENCY EIGHT STROKE INTERNAL COMBUSTION ENGINE

CROSS-REFERENCE TO RELATED APPLICATIONS

Not applicable

FEDERALLY SPONSORED RESEARCH

Not applicable

SEQUENCE LISTING OF PROGRAM

Not applicable

BACKGROUND OF THE INVENTION

1. Field of the Invention

The present invention relates to internal combustion engines in general, and more specifically, to engines equipped with heat recovery systems in order to have a higher thermal efficiency than conventional two, four, six, eight, or more stroke internal combustion engines.

2. Description of Prior Art

The internal combustion (IC) engine is well over 100 years old. The original US patent was issued to Nicolaus Otto on Aug. 14, 1877 for a four-stroke spark ignited (SI) engine. An earlier patent was issued to Otto for a four-stroke engine in Germany. A compression ignition (CI) engine, or Diesel engine, was invented a few years after this. Other than rotary engines, which were introduced many years later, internal combustion engines have powered our society and are found almost everywhere. These engines have primarily been both two and four stroke varieties.

Many improvements have been made to both the SI and CI engines over the years to improve their thermal efficiencies and to reduce their emissions of noxious chemicals, particularly unburned hydrocarbon (HC), carbon monoxide (CO), and mixed nitrous oxides (NOx). Thermal efficiencies have increased over this time frame from single digits up to about 32% in everyday usage. One research study showed a thermal efficiency approaching 43% on a four-stroke SI engine fueled with and optimized for neat methanol (Matthew Brusstar, et al., "High Efficiency and Low Emissions from a Port-Injected Engine with Neat Alcohol Fuels", SAE Paper 2002-01-2743, 2002). This high efficiency was made possible by modifying the engine to make use of the higher octane of alcohol as compared to gasoline. The CI engines have achieved 52% to 57% thermal efficiency in large slow speed maritime applications. The MAN S80ME-C7 has a specific fuel consumption of 155.85 to 167.85 g/Kwh. These efficiencies are the peaks or maximums, not the average efficiencies. The ratio of weight to power output of IC engines has dropped over this same period, thus allowing their application in high power transportation demands all the way down to their use in hand tools and model airplanes.

An internal combustion (IC) engine always includes one or more cylinders. Within each cylinder is a reciprocating piston connected to a crankshaft, which converts the reciprocating motion of the piston to a circular motion. In some rare cases, the reciprocating motion can be used directly, such as in electrical power generation or in pile driving. Four strokes are performed in the conventional IC engine; these include air or oxidizer intake, compression, power or combustion, and exhaust. These form the complete cycle. Two stroke IC engines are also very common, but they are less efficient and emit more noxious chemicals than a four-stroke engine.

The main problem with internal combustion engines is the low thermal efficiency of the complete cycle. Thermal efficiency is defined as the useful work output of an engine divided by the fuel consumed at its lower heating value. The peak thermal efficiency for a SI engine may be 32% in an automotive application, but the thermal efficiency of the same engine at its normal operating point may be only 15 to 20% or lower. In the 20% thermal efficiency case, 80% of the heat energy in the fuel is discarded as waste heat and is not converted to useful work. In a conventional engine, this heat is lost through the exhaust and through the cooling system, whether the engine is air cooled or liquid cooled. Friction inside the engine also accounts for 10 to 25% of the gross work output from the engine. This friction ends up as heat exiting the engine, so this friction is already included in the peak efficiency figures given. There are ways of increasing the thermal efficiency of an engine, but in each case, there are trade offs. Increasing the compression ratio of an engine can raise engine efficiencies, but this is limited by the combustion characteristics of the fuel. Air-to-fuel ratios can also be varied. In this case, less than stoichiometric fuel can be utilized; meaning that excess air is present. Combustion in this case produced too much NOx in the exhaust. Combustion can also be greater than stoichiometric, thus producing an exhaust with unburned hydrocarbons (HC) and carbon monoxide (CO). The air-to-fuel ratio must be stoichiometric for the current after-treatment catalysts to give emissions which meet or exceed government mandates.

There are other ways of increasing the thermal efficiency of IC engines. These have included turbocharging, supercharging, recycling the heat, double or triple reduction of exhaust pressure, port fuel injection, direct fuel injection, homogeneous charge compression ignition, and other ignition regimes. Work is on going on variable valve timing, camless valve operation, and cylinder deactivation to name a few. These have increased and are increasing thermal efficiencies but these improvements need to occur at a more rapid rate. A paradigm shift in thermal efficiency is needed and is provided by this invention.

There have been many variations of the four-stroke IC engine in an effort to improve the thermal efficiency. Others have recognized this deficiency in the four-stroke engine and have made steps to recover and recycle this heat. These efforts have resulted in increasing the number of strokes from four to six or eight or more. In a six-stroke engine, strokes one through four generally include air intake, compression, power or combustion, and exhaust as in a conventional four-stroke engine. A fluid, usually water but sometimes air, is injected in stroke five to recover some of the heat remaining in the cylinder, piston, and head. This fluid is expanded or vaporized from the heat remaining in the metal of the cylinder, piston, and head and is thus pressurized without additional fuel being consumed. In the case of water being added, this water is vaporized to steam with its pressure dependent on the temperature and heat contained in the metal of the cylinder, piston, and head and is also dependent on the temperature and volume of water injected. This produces an additional power stroke without the introduction of additional fuel. Hot water is sometimes used rather than cold water and this allows the pressure developed during stroke five to be greater and thus to convert more heat to work. Stroke six is the exhaust stroke to remove either the vaporized water or heated fluid from the cylinder before repeating the air intake stroke. There are, of course, other variations of this theme but all give a second power stroke within the six strokes of the engine.

There are many examples of six stroke engines in the patent literature. Some of the earliest and most influential US patents include the following:

U.S. Pat. No. 1,217,788 by Liedtke teaches six, eight, ten, or more strokes with the second power stroke forward provided by steam from an external source. It teaches minimal heat recovery and no water jacket on the cylinder.

U.S. Pat. No. 1,324,133 by Still teaches a double let down of the combustion gas pressure.

U.S. Pat. No. 1,339,176 by Dyer teaches water injection in stroke five which is vaporized to produce a second power stroke. No heat recovery is taught as well as no water jacket to cool the cylinder.

U.S. Pat. No. 2,671,311 by Rohrbach teaches heat recovery, air preheat, and condensing the water exiting the cylinder.

U.S. Pat. No. 3,964,263 by Tibbs teaches enhancement of the surface area of the piston and head to promote vaporization of the injected water.

U.S. Pat. No. 4,143,518 by Kellogg-Smith teaches heat recovery and injection of hot water into the cylinder for an additional power stroke.

U.S. Pat. No. 4,402,182 by Miller teaches the introduction of water at the end of stroke 3 after detonation to provide more work. This is truly a modified four-stroke engine.

U.S. Pat. No. 4,433,548 by Hallstrom teaches the introduction of steam into stroke five from recovered heat. A steam condenser is also taught to increase the recovery of work.

U.S. Pat. No. 4,513,568 by Bajulaz teaches the use of heated compressed air to produce the second power stroke. Waste engine heat is used to heat the air.

U.S. Pat. No. 6,095,100 by Hughes teaches the recovery of heat from the exhaust by a water spray with the resulting steam used in a vane motor to generate more work.

Patent application 2007/360022977 by Bruce Crower teaches the injection of water in stroke five to produce a second power stroke. No heat recovery is taught. No water jacket is required to cool the cylinder.

In an eight-stroke engine, strokes one through four generally include air intake, compression, power or combustion, and exhaust as in a conventional four-stroke engine. There are many variations after the first four strokes. Examples from the U.S. patent literature relating to eight-stroke engines include the following:

U.S. Pat. No. 1,217,788 by Liedtke teaches six, eight, ten, or more strokes with the second or greater power strokes provided by steam from an external source. It teaches minimal heat recovery and no water jacket on the cylinder.

U.S. Pat. No. 5,598,819 by Blackburn teaches a four-stroke engine which can go to an eight-stroke engine when the load requirement is reduced. There is only one power stroke for each four or eight strokes.

U.S. Pat. No. 5,732,677 by Baca teaches two air intakes for each power stroke and no heat recovery. This engine would run at a much higher compression ratio.

U.S. Pat. No. 6,363,907 by Arai et al teaches a control scheme for an engine running on four, eight, or 16 cycles.

U.S. Pat. No. 6,443,108 by Brehob et al teaches multiple less than stoichiometric ratio combustions before the last combustion which would be at a stoichiometric ratio. The combustion gases are run through multiple cylinders while adjusting the air-to-fuel ratio. Strokes include 4, 6, 8, or greater.

U.S. Pat. No. 6,918,458 by Hu teaches a double expansion of the combustion gases with no engine cooling and no heat recovery.

Patent application 2007/470044778 by Milovanovic et al teaches two or three fuel power strokes at different air-to-fuel ratios with different pressure let down cylinders.

Patent application 2007/540119407 by Hu teaches double reduction of exhaust gases in a ten-stroke rotary engine.

The eight-stroke engine described in this invention has the first four strokes the same as other eight-stroke engines; however, strokes five through eight are different. The drawings and the descriptions that follow will clearly show those differences and the advantages of this eight-stroke engine over prior art.

BRIEF SUMMARY OF THE INVENTION

This invention presents an eight-stroke internal combustion engine and a method for operating the eight different strokes of this engine. A method to recover and recycle heat from the three exhaust strokes is included which increases the work output of this engine without requiring additional fuel. This invention and its included method of operation result in increased thermal efficiency of this engine. This eight-stroke engine includes a crankcase, at least one rotating crankshaft, and connecting rods, which convert the reciprocating motion of one or more pistons to the rotating motion of the crankshaft. These pistons go up and down in a cylinder equipped with valves, which allow for eight different strokes of this engine. These strokes are air or oxidizer intake, compression, combustion or power stroke one, exhaust, water or steam injection into the cylinder resulting in power stroke two, exhaust of steam, water or steam injection into the cylinder resulting in power stroke three, and the exhaust of steam. The engine, the conduits between the various parts, and the heat recovery system are well insulated in order to retain as much heat as practical. The three exhausts from this engine go to a heat recovery system where heat is recovered and is reused in subsequent strokes. This recovered heat is converted to work without the need for additional fuel. Fuels, which can be used in this engine, include hydrocarbons, hydrogen, or mixtures of each. Hydrocarbons include, but are not limited to, natural gas, reformed gas, methane, ethane, butane, propane, alcohols, gasoline, diesel, fuel oil, and coal. This process of operating an internal combustion engine with the recycling of exhausted heat results in a more thermally efficient engine. There are several advantages of this invention, the most obvious include less fuel required for work delivered and less noxious emissions for the work delivered.

BRIEF DESCRIPTION OF THE DRAWINGS

The figures included are simplified cross sectional side views of a single cylinder and piston, which depict schematically the eight different strokes and the heat recovery and recycle system of the present invention.

FIG. 1 depicts the first stroke of the engine operation in which air enters the engine. The figure also shows schematically the other parts necessary for the operation of this invention excluding the heat recovery system. These pieces are repeated in the FIGS. 2 through 11. These include the piston, cylinder, combustion chamber, four different intake and exhaust valves, spark plug or other igniting device, fuel injecting device, water injecting device, steam exhaust conduit, steam chamber, products of combustion exhaust conduit, connecting rod, and crankshaft. This stroke is classically described by those versed in the art as the intake stroke. An oxidizer, in this case air, enters the cylinder as the piston descends. Fuel may or may not be taken in during this stroke.

FIG. 2 depicts the oxidizer or air taken in being compressed. At the end of this stroke, there will be fuel in the combustion chamber, whether added during stroke one or during this compression stroke.

FIG. 9 depicts the cylinder and piston shown in FIGS. 1 through 8 but includes the heat recovery and recycle system. The products of combustion from stroke four go to a vaporizer where superheated water is vaporized to steam for use in stroke seven. The steam exhaust from strokes six and eight go to a heat recovery exchanger to heat the water going to the vaporizer. The superheated water from the vaporizer is used in stroke five.

It is understood that this engine and its associated part are well insulated to retain as much heat as practical. This is not shown in the drawings for purposes of clarity.

REFERENCE NUMERALS FOUND ON THE DRAWINGS 1 piston
2 cylinder
3 combustion chamber, variable volume chamber
4 air intake
5 air intake valve
6 spark plug
7 fuel injector
8 water injector
9 steam exhaust
10 steam exhaust valve
11 steam chamber
12 steam chamber valve
13 combustion exhaust
14 combustion exhaust valve
15 head
16 connecting rod
17 crankshaft
18 secondary steam chamber
19 secondary steam chamber valve
20 vaporizer
21 superheated water
22 conduit for combustion gas
23 conduit for superheated water
24 conduit for steam
25 steam chest
26 engine exhaust
27 secondary conduit for steam
30 heat recovery exchanger
31 conduit for superheated water to vaporizer
32 conduit for hot water to heat recovery exchanger
33 conduit for low pressure steam to heat recovery
40 condenser
41 hot water reservoir
42 conduit for water and steam to condenser
43 fan for condenser
44 cabin heat recirculation pump
45 conduit for recirculating hot water
46 vaporizer feed pump
50 cabin heater
51 fan for cabin heater
52 conduit for return water to reservoir

DETAILED DESCRIPTION OF THE INVENTION

For simplicity in describing this invention, the figures illustrate only one piston inside one cylinder attached to one crankshaft. This invention may use any number of cylinders and pistons as well as multiple crankshafts. The figures are illustrative and are not drawn to scale but schematically depict the method of operating this invention. This engine may be either spark ignited (SI), compression ignited (CI), or utilizing some other means of igniting the combustible mixture. The fuels to be used in this invention include all hydrocarbons as well as hydrogen or mixtures thereof. It is understood that the cylinder 2; the head 15; the connecting conduits 22, 23, 24, 27, 31, 32, 33, 42, and 45; the vaporizer 20 and the steam chest 25; the heat recovery exchanger 30; the pumps 44 and 46; and the hot water reservoir 41 are all insulated to retain heat. This insulation is not shown for clarity on the drawings.

Figure 1:
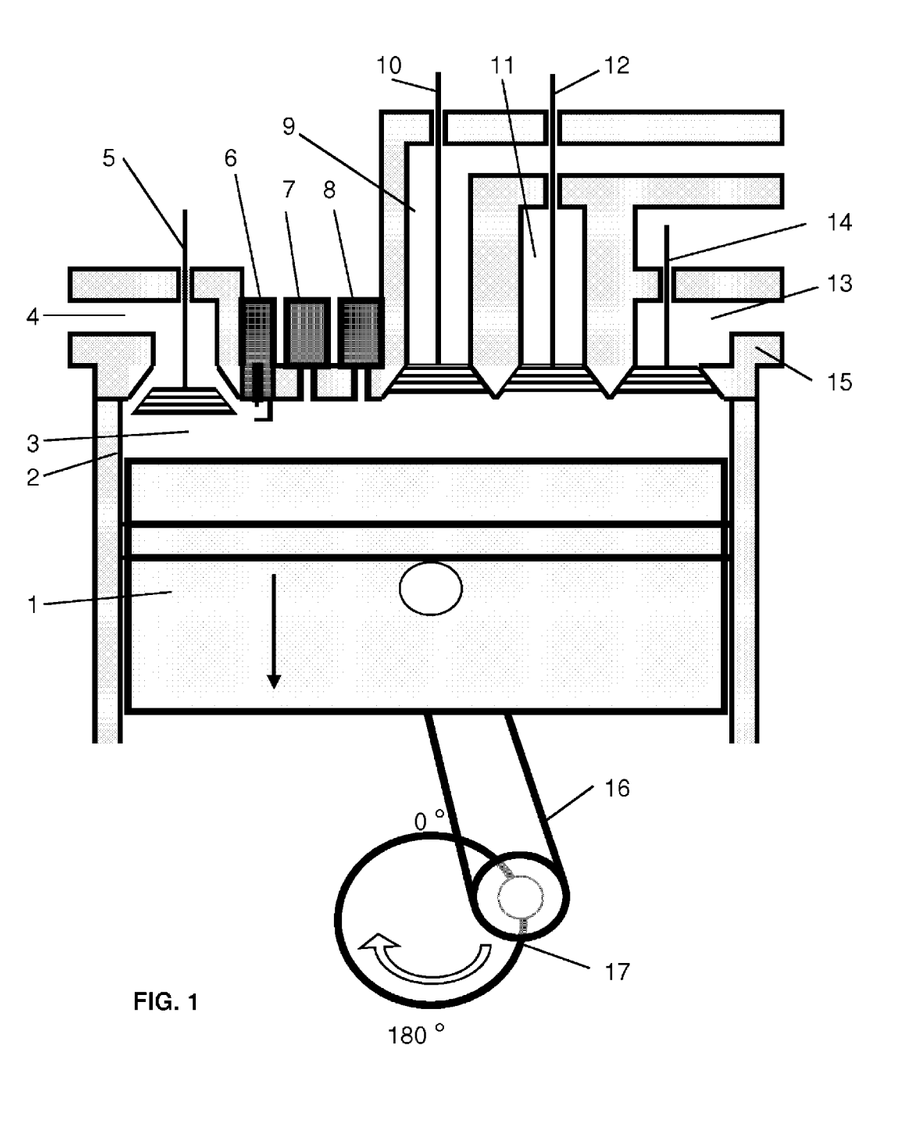

FIG. 1 is a cross sectional view of one piston 1 and cylinder 2 assembly. This figure depicts the first stroke of an internal combustion engine called the air intake stroke by those skilled in the art. This stroke commences when the crankshaft 17 is at rotation angle 0 degrees and goes until the crankshaft rotation is at 180 degrees. The piston 1 reciprocates within its cylinder 2. The reciprocating movement of the piston 1 results in varying the volume of the combustion chamber 3. This reciprocating motion of the piston 1 is connected through the connecting rod 16 to the crankshaft 17. This assembly of items 1, 16, and 17 converts the reciprocating motion of the piston into rotary motion of the crankshaft 17. Air intake conduit 4 allows the passage of air into the combustion chamber 3 when the air intake valve 5 is open and the piston 1 is descending as shown in FIG. 1. The piston 1 ceases its downward motion when the piston reaches bottom dead center (BDC). BDC is the lowest point of the movement of the piston 1 and is also the point of greatest volume of the combustion chamber 3. This BDC is at the crankshaft 17 rotation angle 180 degrees. Fuel may be mixed with the air as it enters the air intake conduit 4 from a carburetor or through fuel injection into the air stream as it flows into the combustion chamber 3. These two options are not shown in FIG. 1 but are well understood by those skilled in the art.

Figure 2:
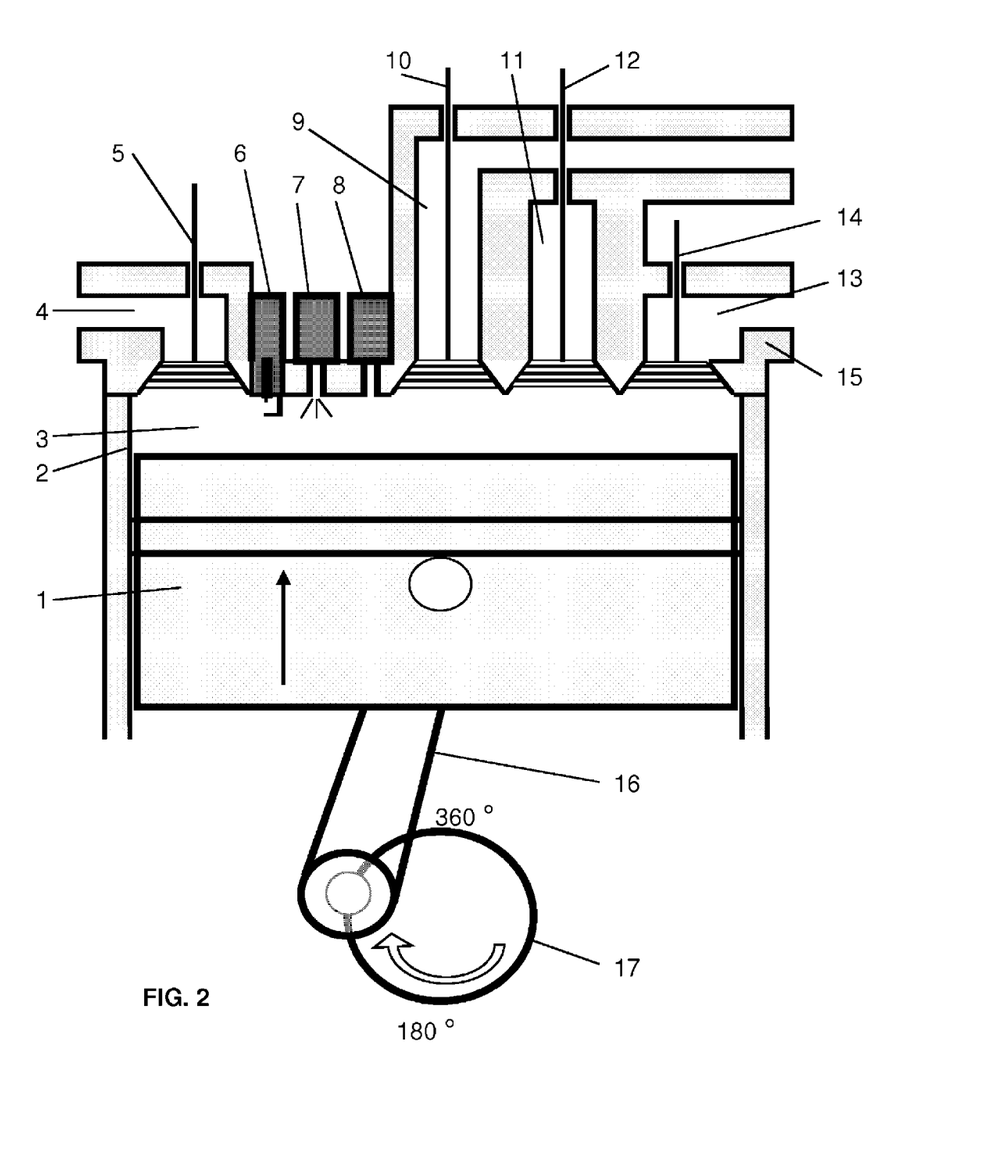

FIG. 2 depicts the second stroke of an internal combustion engine called the compression stroke by those skilled in the art. This stroke commences when the crankshaft 17 is at rotation angle 180 degrees and goes until the crankshaft rotation is at 360 degrees. All valves 5, 10, 12, and 14 are closed while the air, which entered the combustion chamber 3 during stroke one, is compressed. Fuel may be added to the air in several different ways and these ways are familiar to those skilled in the art. These include the use of a carburetor, fuel injection into the air as it enters the combustion chamber but before the air intake valve, and fuel injected directly into the combustion chamber. The first two methods of introducing fuel into the air are not illustrated in the drawings. In the preferred embodiment, the third method is illustrated and described. Fuel is added directly to the combustion chamber 3 during this stroke through the fuel injector 7. The upward motion of piston 1 ceases at rotation angle 360 degrees. This point in the cycle is referred to as top dead center (TDC). Several degrees before reaching TDC, the spark plug 6 sparks across its electrodes and begins the ignition of the fuel and air mixture.

Figure 3:
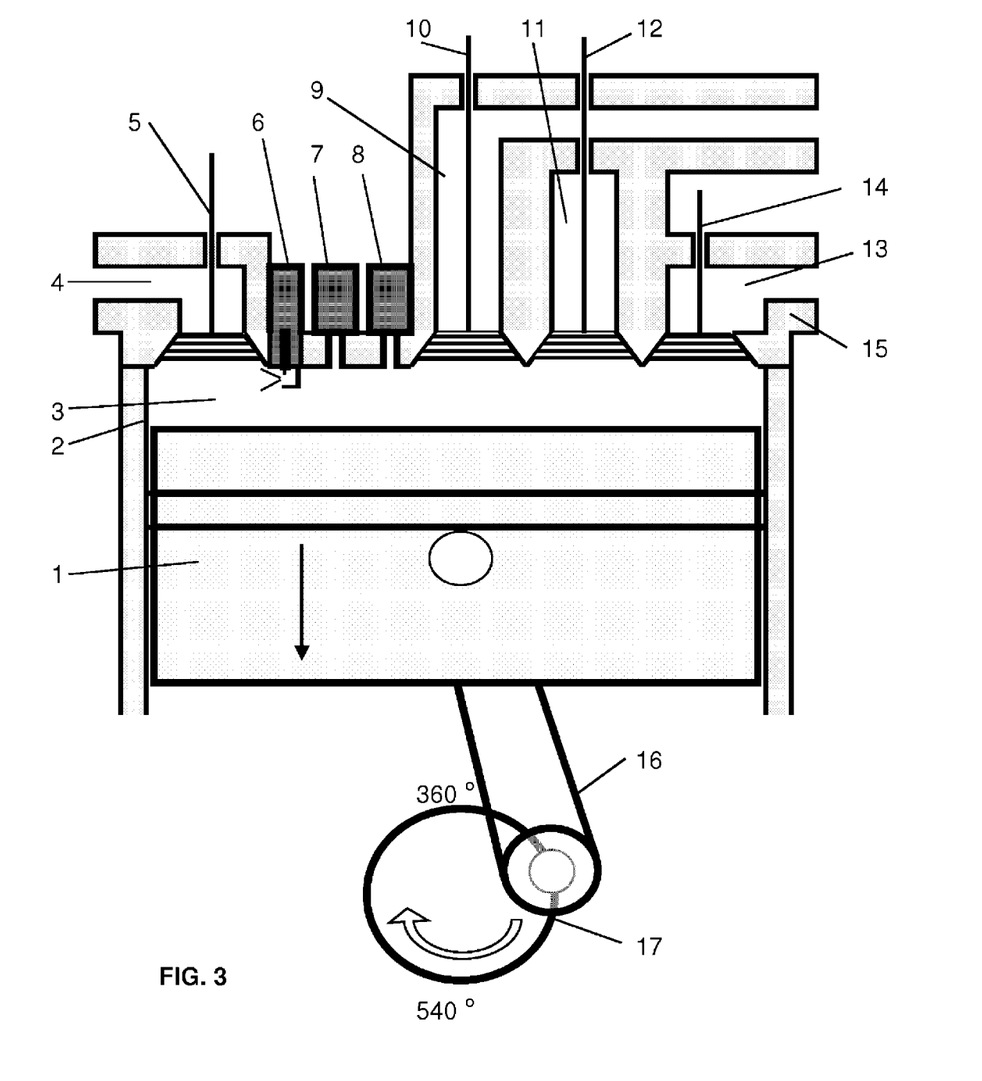
FIG. 3 depicts the combustion of the fuel and air and is the first power stroke. The fuel is combusted to produce the first power stroke of the engine.

FIG. 3 depicts the third stroke of an internal combustion engine called the power stroke by those skilled in the art. This stroke commences when the crankshaft 17 is at rotation angle 360 degrees and goes until the crankshaft rotation is at 540 degrees. All valves 5, 10, 12, and 14 are closed while the air and fuel mixture is combusted in the combustion chamber 3. During the combustion of the air and fuel, there is a rapid rise in the temperature and pressure inside the combustion chamber 3. This pressure exerted on the exposed face of piston 1 as it descends inside the cylinder 2 produces work. In this manner, the heat contained in the fuel is converted to work. Work continues to be produced until the piston 1 reaches BDC, at which point the piston 1 ceases to reciprocate momentarily.

Figure 4:
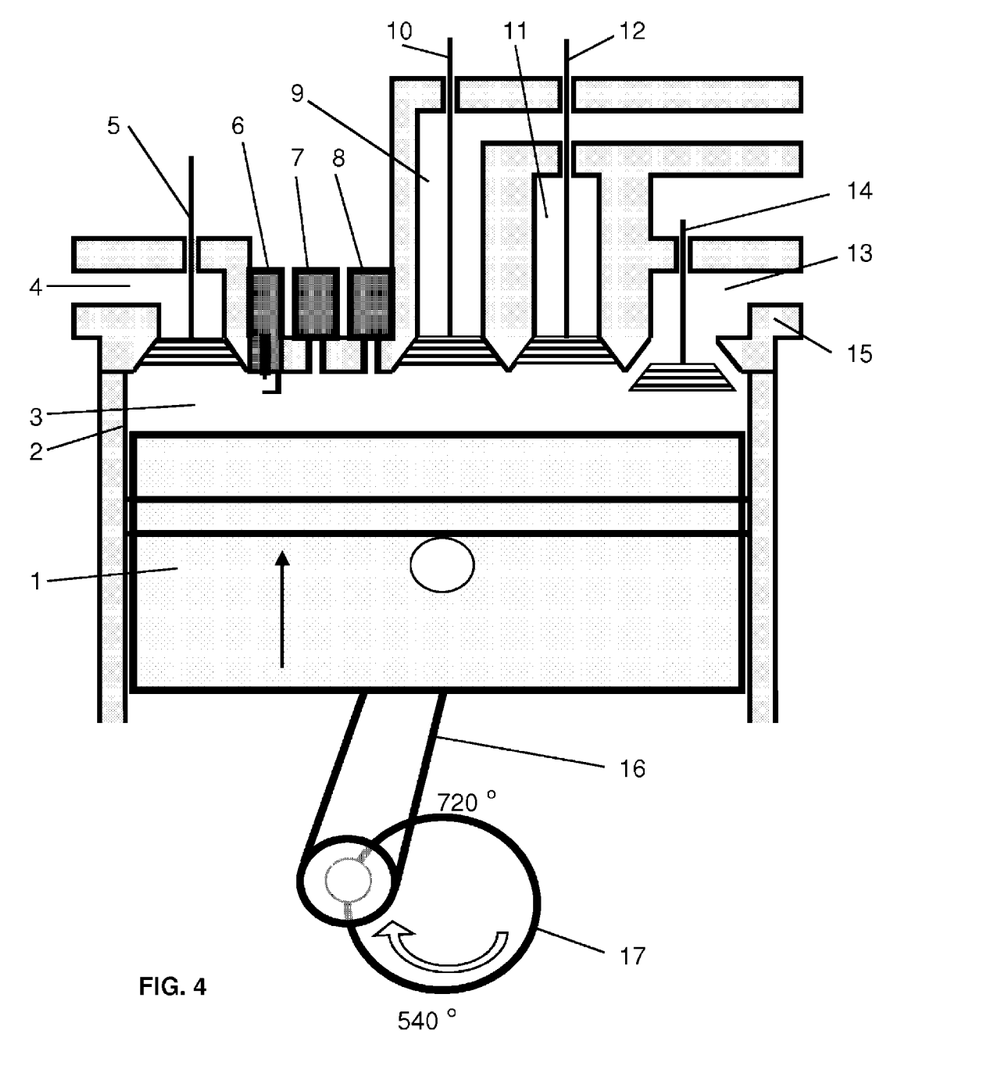
FIG. 4 depicts the exhaust of the products of combustion from power stroke one. The destination of this exhaust will be clearly shown in FIG. 9.

FIG. 4 depicts the fourth stroke of an internal combustion engine called the exhaust stroke by those skilled in the art. This stroke commences when the crankshaft 17 is at rotation angle 540 degrees and goes until the crankshaft rotation is at 720 degrees. Only combustion exhaust valve 14 is opened during this stroke. During stroke four, the gases remaining from the combustion of the air and fuel are swept out of the combustion chamber 3. These gases are pushed out through the open combustion exhaust valve 14 and through the combustion exhaust conduit 13. These hot gases pass through the conduit for combustion gas 22 to the vaporizer 20. This conduit for combustion gas 22 would include the gases from other cylinders if more than one cylinder were included in the engine. The combustion exhaust valve 14 closes as the rotation of the crankshaft 17 approaches TDC which in stroke four is 720 degrees. At the end of stroke four, there remains a great deal of heat at high temperature in the metal of the head 15, the piston 1, and the cylinder 3. Some of this heat will be utilized during strokes five and seven.

Figure 5:
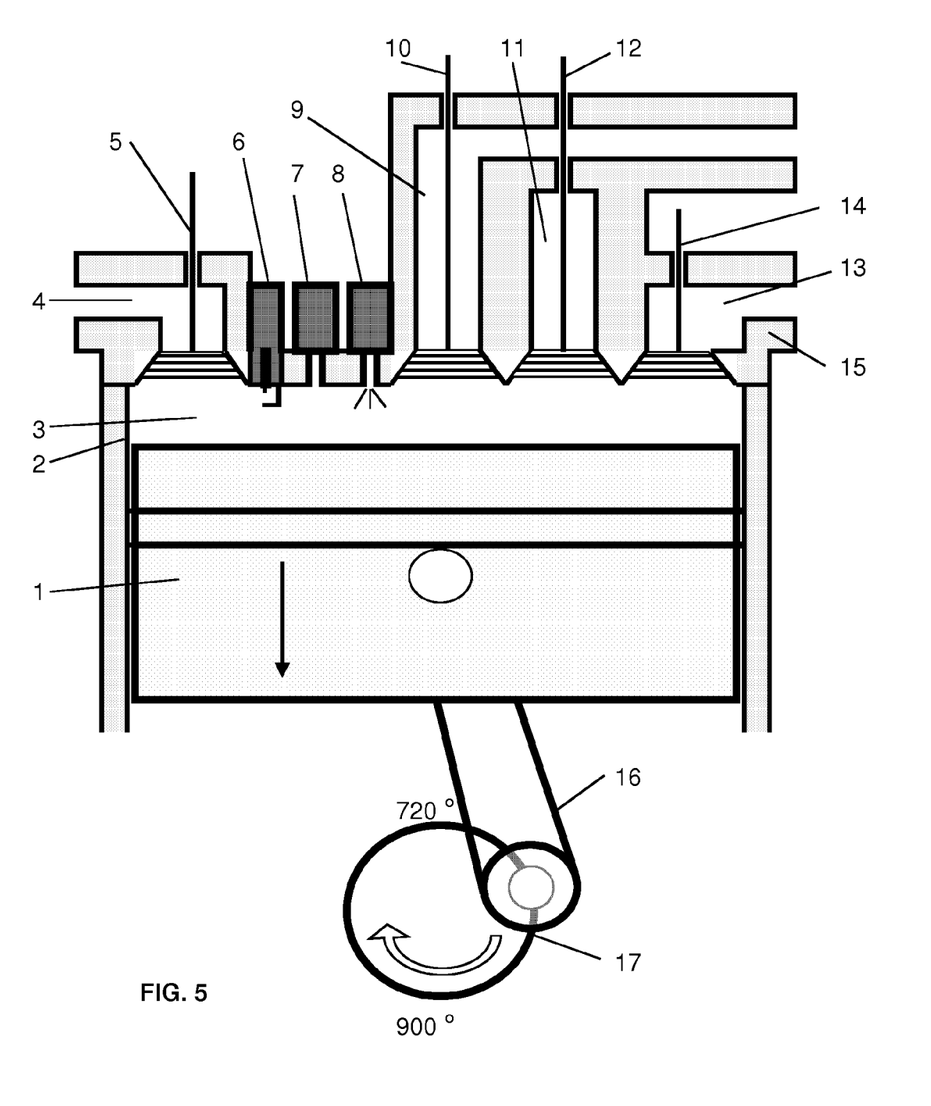
FIG. 5 depicts the injection of water into the now empty combustion chamber. This water flashes to steam and produces the second power stroke.

FIG. 5 depicts the fifth stroke of this eight-stroke internal combustion engine and is the second power stroke. This stroke commences when the crankshaft 17 is at rotation angle 720 degrees and goes until the crankshaft rotation is at 900 degrees. All valves 5, 10, 12, and 14 are closed while hot water is injected into the combustion chamber 3 through water injector 8. This superheated water 21 from vaporizer 20 is immediately flashed to steam from the heat remaining in the metal of the head 15, the piston 1, and the cylinder 3. This flashed water rapidly reaches a high pressure inside the combustion chamber 3. This pressure exerted on the exposed face of piston 1 as it descends inside the cylinder 2 produces work. In this manner, a portion of the heat contained in the metal of the head 15, the piston 1, and the cylinder 3 is converted to work. This heat would be lost in a normal four-stroke internal combustion engine, but in this engine, this heat is converted to work without additional fuel.

Figure 6:
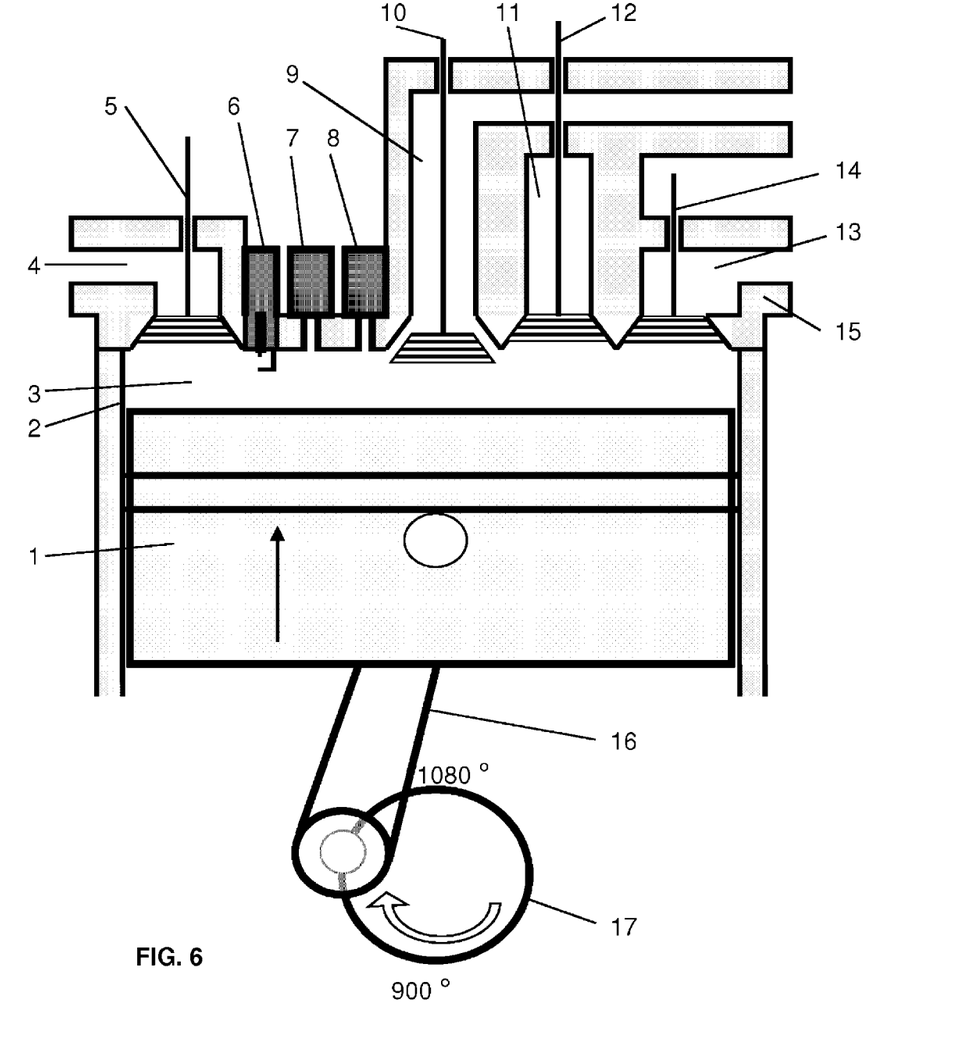
FIG. 6 depicts the exhaust of the steam from stroke five. The destination of this exhaust will be clearly shown in FIG. 9.

FIG. 6 depicts the sixth stroke of this eight-stroke internal combustion engine and is the second exhaust stroke. In this stroke, the exhaust is primarily steam rather than products of hydrocarbon or hydrogen combustion. This stroke commences when the crankshaft 17 is near rotation angle 900 degrees and goes until the crankshaft rotation is near 1080 degrees. Steam exhaust valve 10 is open and the steam exhausts through steam exhaust conduit 9. This hot steam passes through the steam exhaust conduit 9 followed by its passage through the conduit for low pressure steam to heat recovery 33. This conduit 33 would include the low pressure steam from other cylinders if more than one cylinder were included in the engine. Low pressure steam from all cylinders would pass to the heat recovery exchanger 30. The steam exhaust valve 10 closes as the rotation of the crankshaft 17 approaches TDC which in stroke six is 1080 degrees.

Figure 7:
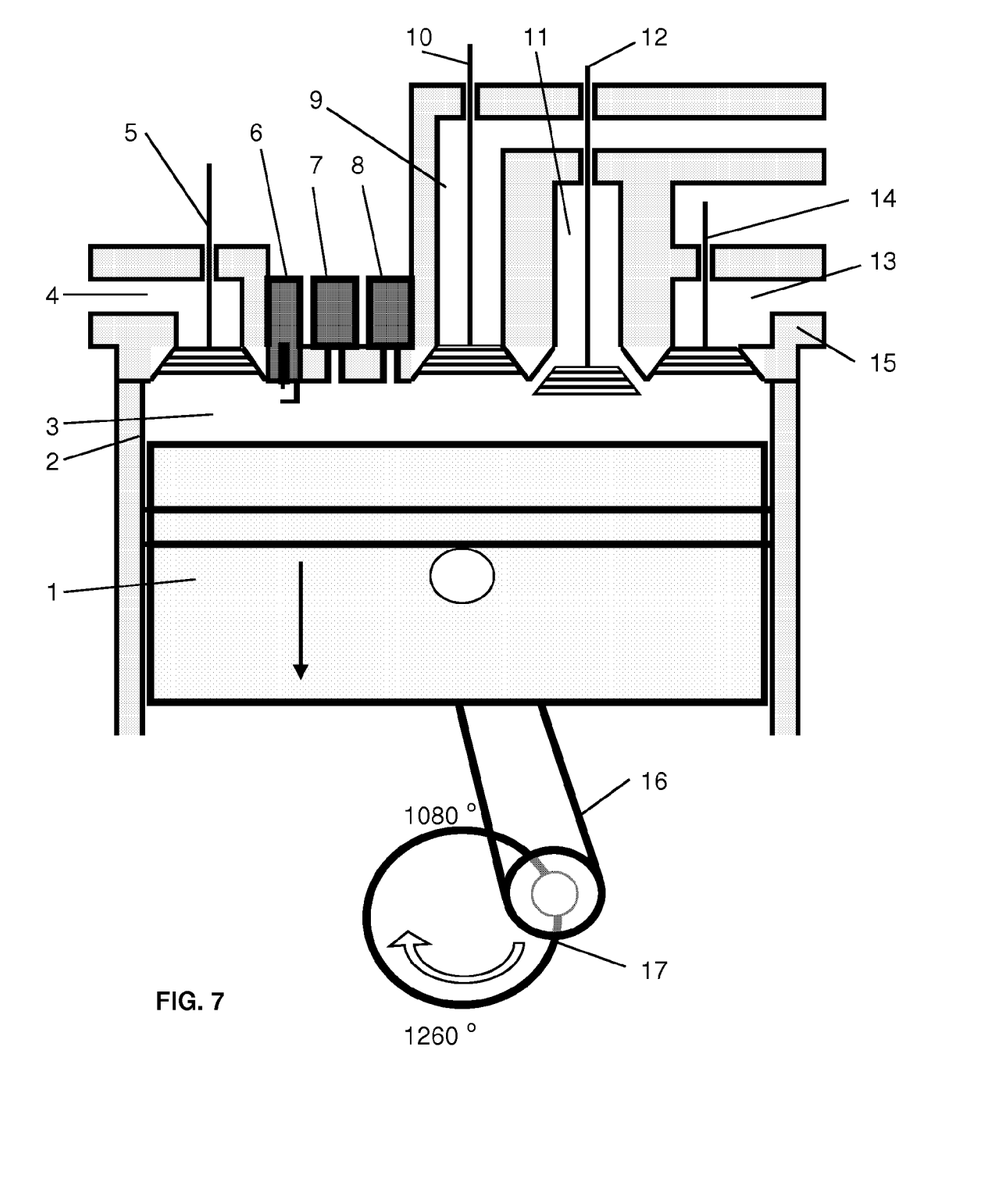
FIG. 7 depicts the addition of steam under pressure from a steam chamber into the combustion chamber. The volume of this steam chamber varies according to the design intent of the engine. The chamber volume can vary from 0.1% to 82% of the individual piston displacement. The expansion of this steam produces the third power stroke.

FIG. 7 depicts the seventh stroke of this eight-stroke internal combustion engine and is the third power stroke. This stroke commences when the crankshaft 17 is at rotation angle 1080 degrees and goes until the crankshaft rotation is at 1260 degrees. Valves 5, 10, and 14 are closed while valve 12 is opened to allow steam from the steam chamber 11 to enter the combustion chamber 3. Steam chamber 11 is prefilled with steam from the vaporizer 20 through conduit for steam 24. This pressure exerted on the exposed face of piston 1 as it descends inside the cylinder 2 produces work. In this manner, a portion of the heat recovered from the exhaust of stroke 4 is converted to work. This exhaust heat would be lost in a normal four-stroke internal combustion engine, but in this engine, a portion of this heat is converted to work without additional fuel.

Figure 8:
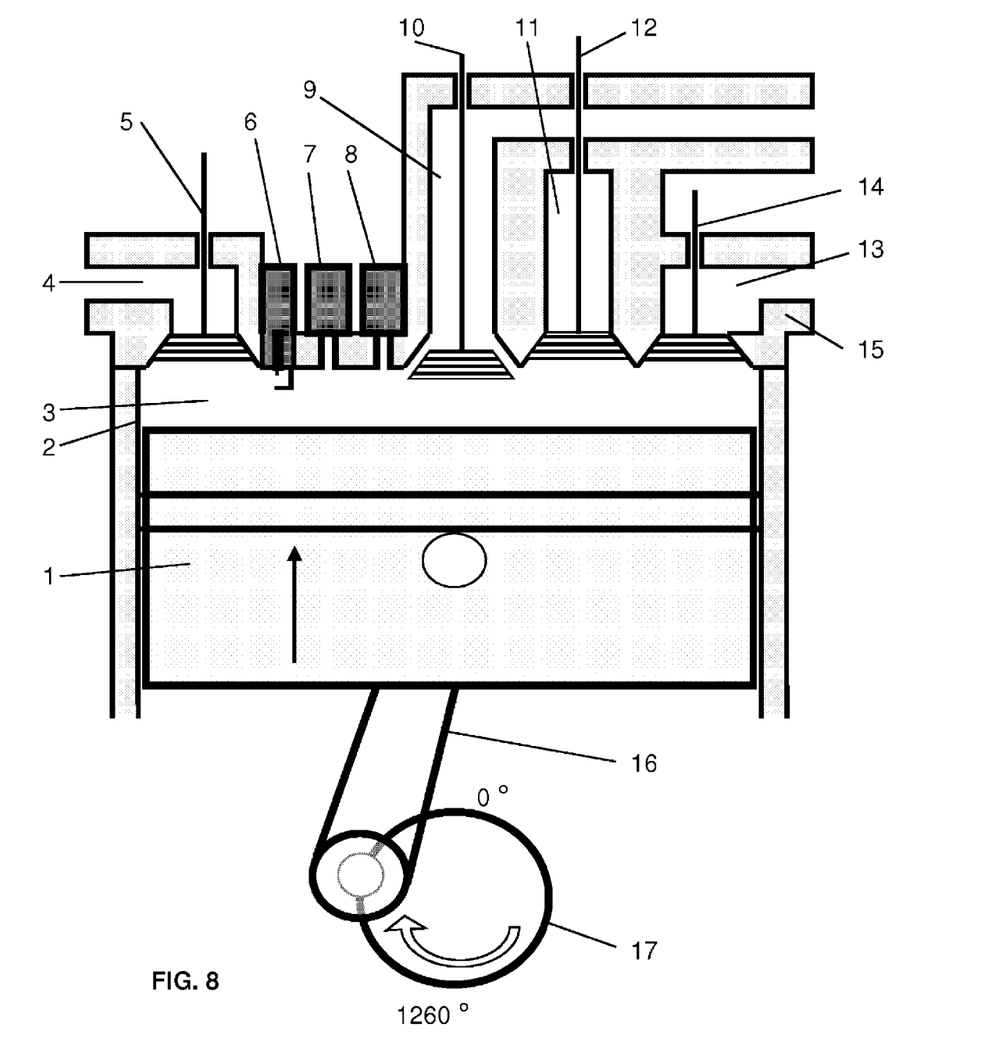
FIG. 8 depicts the exhaust of the steam from stroke seven. The destination of this exhaust will be clearly shown in FIG. 9.

FIG. 8 depicts the eighth stroke of this eight-stroke internal combustion engine and is the third exhaust stroke. In this stroke, the exhaust is essentially all steam. This stroke commences when the crankshaft 17 is near rotation angle 1260 degrees and goes until the crankshaft rotation returns to near 0 degrees. Steam exhaust valve 10 is open and the steam exhausts through steam exhaust conduit 9. This superheated steam passes through the steam exhaust conduit 9 followed by its passage through the conduit for low pressure steam to heat recovery 33. This conduit for low pressure steam to heat recovery 33 would include the low pressure steam from other cylinders if more than one cylinder were included in the engine. Low pressure steam from all cylinders would pass to the heat recovery exchanger 30. The steam exhaust valve 10 closes as the rotation of the crankshaft 17 approaches TDC which in stroke eight is 1440 or 0 degrees.

Figure 9:
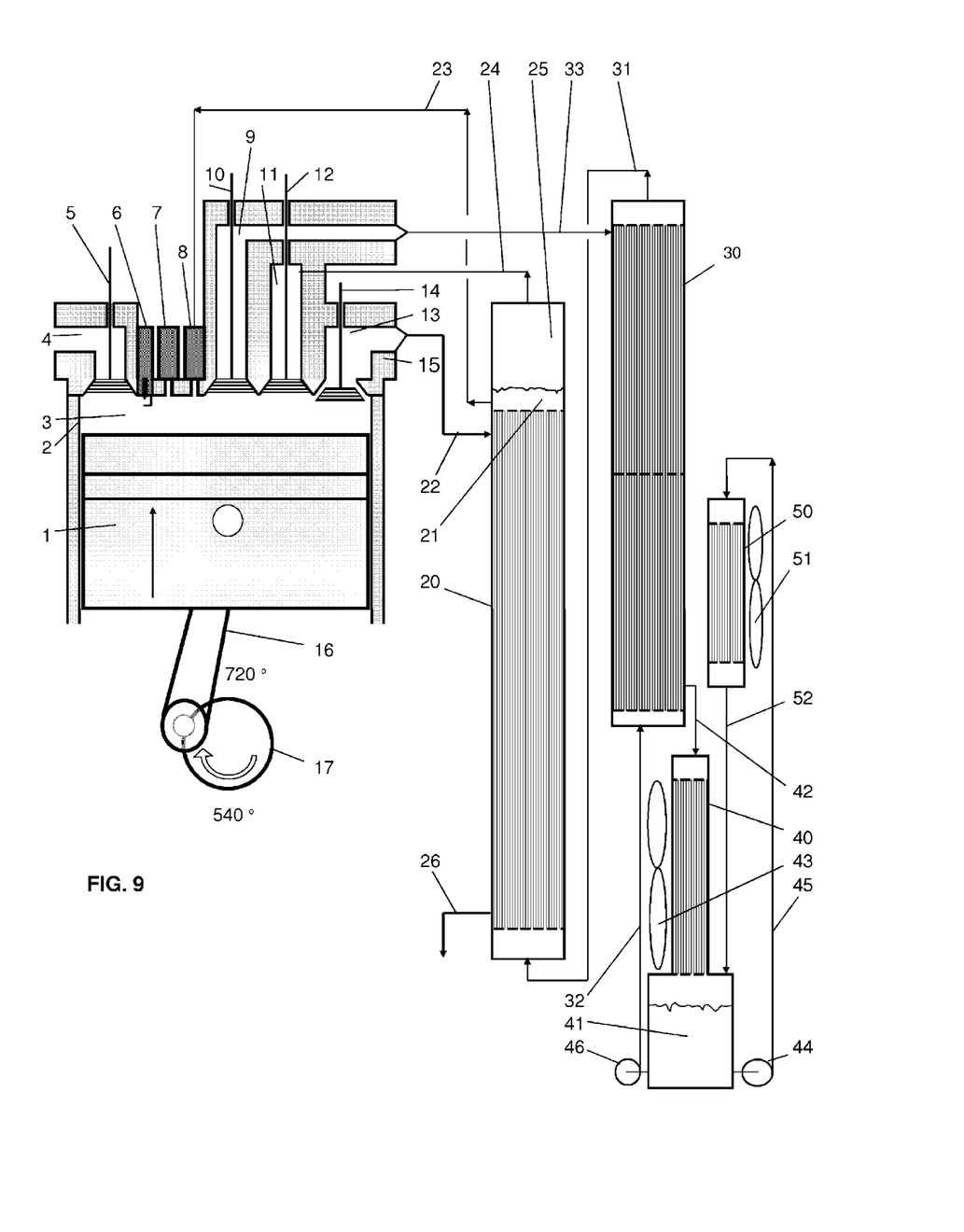

FIG. 9 depicts the heat recovery system of this invention and illustrates the engine during stroke four, the first exhaust stroke of the eight-stroke engine. It is understood that the engine is always connected to its heat recovery system comprised of items 20, 30, 40, and 50. The exhaust from stroke four passes through its open combustion exhaust valve 14 then through the combustion exhaust conduit 13 to the conduit for combustion gas 22 and then to the vaporizer 20. Exhaust from other cylinders not shown would join in through this conduit and flow to vaporizer 20. This exhaust gas exchanges its heat inside the vaporizer 20 with hot water from heat recovery exchanger 30 traveling through the conduit for superheated water to the vaporizer 31. This water after further heat recovery in the vaporizer 20 ends up as superheated water 21 and the portion of the water that flashes to steam ends up in the steam chest 25. The exhaust gas exits the vaporizer 20 through vaporizer exhaust conduit 26. The steam exhaust from strokes six and eight pass through open steam exhaust valve 10 followed by flow through steam exhaust conduit 9 followed by flow through conduit for low pressure steam to heat recovery 33 and then into the heat recovery exchanger 30. Steam exhausts from other cylinders not shown would join in through this conduit and flow to heat recovery exchanger 30. The exhaust gases from the heat recovery exchanger 30 pass through the conduit for water and steam to condenser 42 on its way to the condenser 40. The heat from the low pressure steam is exchanged with water from the hot water reservoir 41 below the condenser 40. Water from hot water reservoir 41 is pumped with the vaporizer feed pump 46 into the heat recovery exchanger 30 through the conduit for hot water to heat recovery exchanger 32 and then into the vaporizer 20 through the conduit for superheated water to vaporizer 31. The vaporizer feed pump 46 controls the level of superheated water 21 above the vaporizer 20. The condenser 40 acts as a small radiator using the fan for condenser 43 to control the temperature of the water in the hot water reservoir 41. The water in the hot water reservoir 41 is used to provide cabin heat through cabin heater 50. In this case, the recirculating water flows through cabin heat recirculating pump 44, through the conduit for recirculating hot water 45, through cabin heater 50, and returns through the conduit for return water to reservoir 52. A fan for cabin heater 51 blows air over the cabin heater 50 to provide hot air for cabin heat. In stroke five, superheated water 21 flows through the conduit for superheated water 23 to the water injector 8. Superheated water 21 is distributed to all cylinders in a multi-cylinder engine through the conduit for superheated water 23 followed by the water injector for that particular cylinder. In stroke seven, steam from the steam chest 25 flows through the conduit for steam 24 into the steam chamber 11. The steam chamber 11 is filled with steam before being needed by the engine. In this way, the pressure in the steam chamber 11 is at steam chest 20 pressure before the steam chamber valve 12 opens into the combustion chamber 3. Steam from steam chest 25 is distributed to all cylinders in a multi-cylinder engine through the conduit for steam 24 followed by the steam chamber for that particular cylinder.

Figure 10:
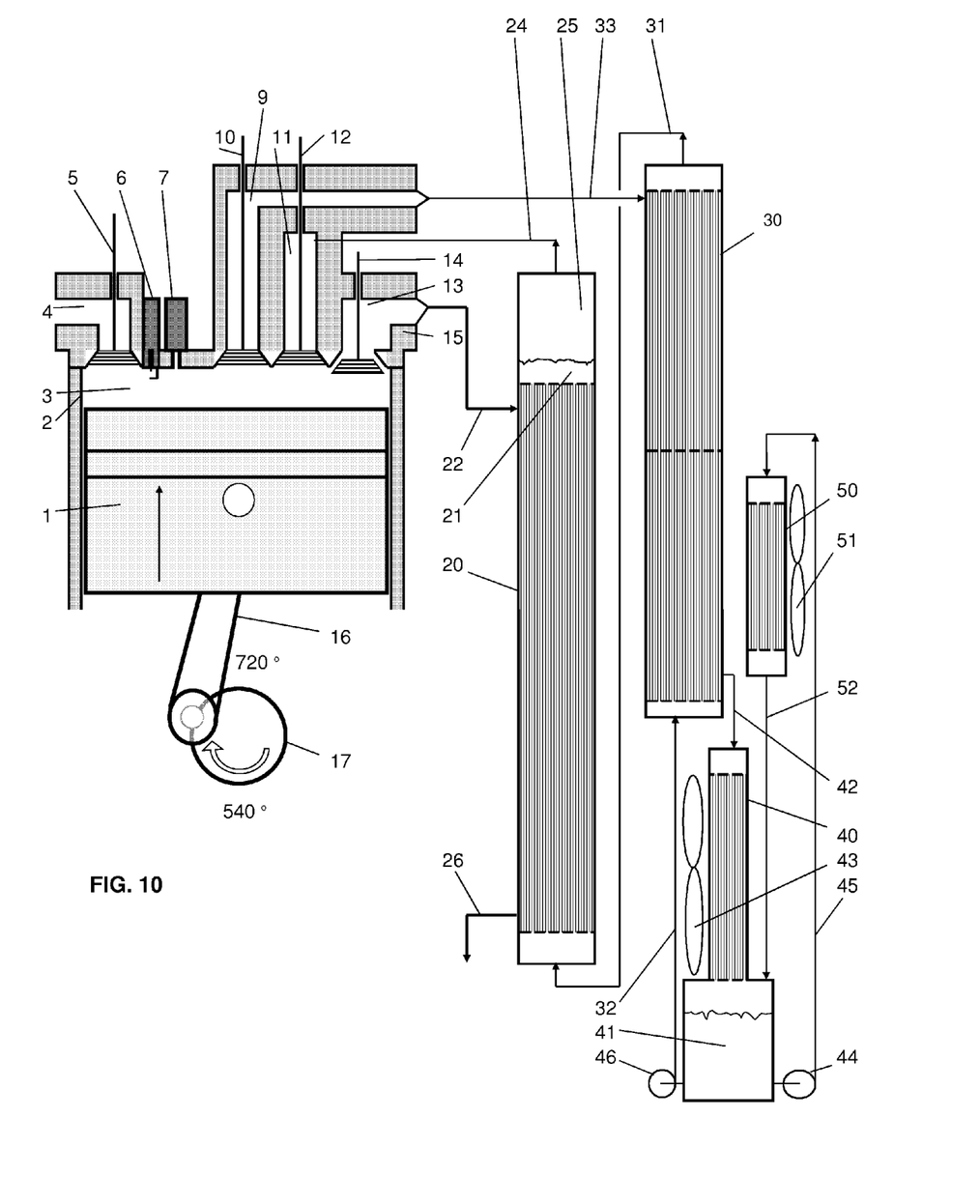
FIG. 10 depicts the use of steam rather than water for stroke five. In this case, steam is introduced through the same steam chamber as stroke seven. The size of this chamber is dependent on the design intent of the particular engine.

FIG. 10 depicts a second embodiment of this eight-stroke internal combustion engine. This figure includes the heat recovery system as just described in FIG. 9. In this embodiment, strokes one through four and strokes six through eight are the same as the first embodiment. The heat recovery system is also the same as described in FIG. 9. Stroke five in this embodiment uses steam from the steam chest 25 above the vaporizer 20 through conduit 24, through steam chamber 11, and through steam chamber valve 12. The head 15 on this engine has been modified in this second embodiment to allow operation using this method. In this embodiment, steam chamber 11 is used for strokes five and seven during the four revolutions of the crankshaft 17.

Figure 11:
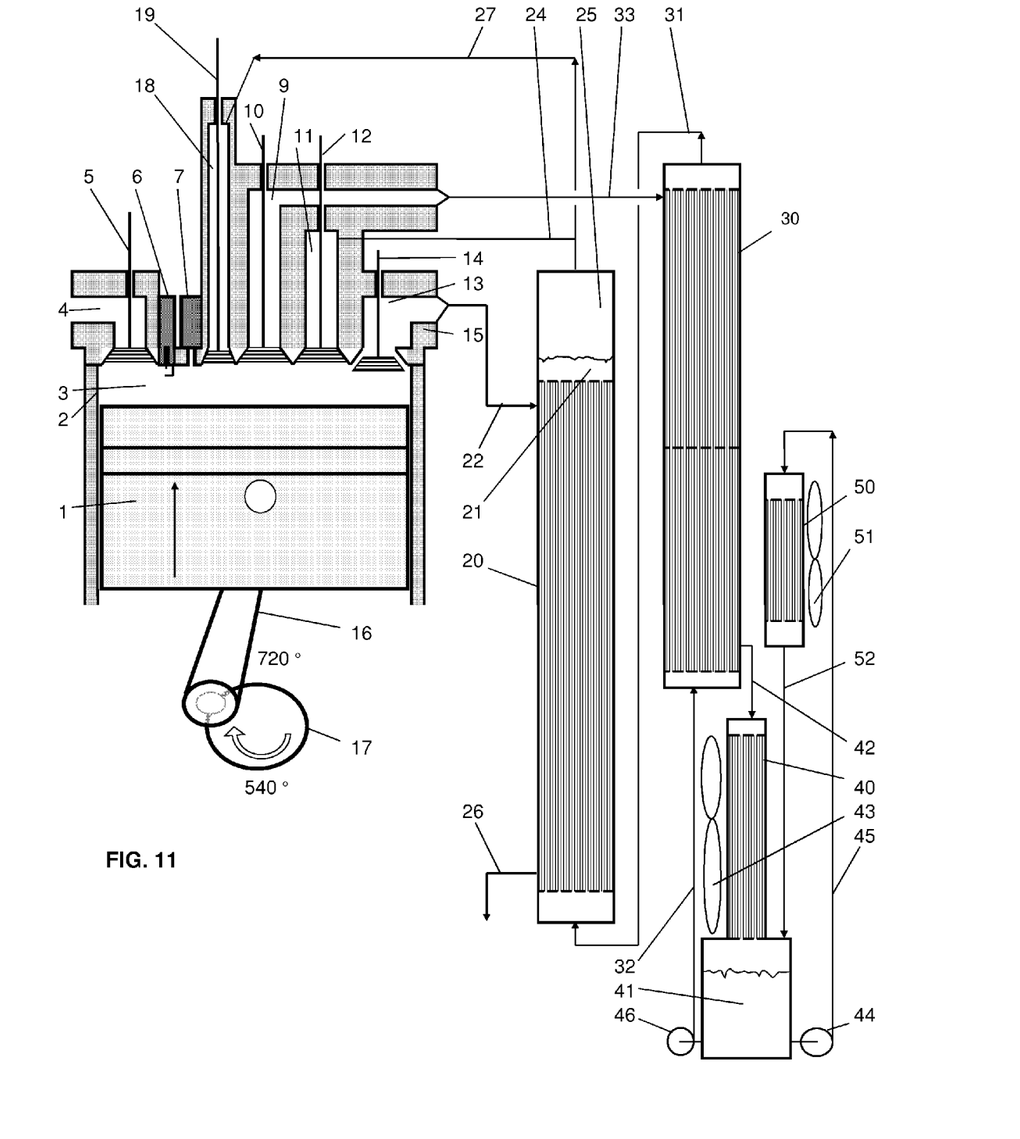
FIG. 11 depicts the use of steam rather than water for stroke five. In this case, the steam is introduced through a secondary steam chamber of different size than the steam chamber used in stroke seven. This secondary steam chamber is equipped with its own discharge valve.

FIG. 11 depicts a third embodiment of this eight-stroke internal combustion engine. This figure includes the heat recovery system as just described in FIG. 9. In this embodiment, strokes one through four and strokes six through eight are the same as the first embodiment. The heat recovery system is also the same as described in FIG. 9. Stroke five in this embodiment uses steam from the steam chest 25 above the vaporizer 20 through branched conduit for steam 27, through secondary steam chamber 18, and through secondary steam chamber valve 19. The head 15 on this engine has been modified in this third embodiment to allow operation using this method.

The heat recovery system made up of vaporizer 20, heat recovery exchanger 30, condenser 40, cabin heater 50, associated fans 43 and 51, connecting conduits, and pumps 44 and 46 are considered prior art by those skilled in the art of heat recovery and recycle. This type of system is not unique to this invention. The heat exchangers portrayed can be shell and tube, plate and frame, double pipe, extended surfaces, or any other known equipment for transferring heat from one fluid to another.

As can clearly be seen from the detailed description of this invention, some of the heat from the combustion of hydrocarbons or hydrogen is recovered in the vaporizer 20 and transferred to both the steam in the steam chest 25 and to the superheated water 21. This steam from the steam chest 25 is used in the engine during stroke seven and the superheated water 21 is used in stroke five. The steam exhaust from strokes six and eight have some of their heat recovered in the heat recovery exchanger 30. In this way, the heat is given several opportunities to be recovered for recycle into the engine and thus to be converted to work. This invention is unique in providing this opportunity for recycle and re-use. Because of this recovery process, the thermal efficiency is increased.

The following is claimed:

1. A method of operating an internal combustion engine having at least one cylinder, said method comprising the steps of:
   inducting air into the cylinder of said engine,
   compressing said air in a compression stroke inside a combustion chamber,
   a means of adding fuel to said air followed by combustion of the fuel and air mixture in said combustion chamber resulting in a first power stroke of said engine,
   exhausting the combusted mixture of fuel and air into a vaporizer,
   injecting hot water from said vaporizer into said combustion chamber which converts to a first portion of steam resulting in a second power stroke,
   exhausting said first portion of steam into a heat recovery exchanger,
   admitting a second portion of steam from the steam chest of said vaporizer into said combustion chamber from an adjacent steam chamber resulting in a third power stroke,
   exhausting said second portion of steam into said heat recovery exchanger.

2. The method according to claim 1 wherein the combustion of said mixture of fuel and air is initiated by a spark inside said combustion chamber.

3. The method according to claim 1 wherein the combustion of said mixture of fuel and air are initiated by compression within said combustion chamber.

4. The method according to claim 1 wherein the fuel of said mixture of fuel and air is a hydrocarbon.

5. The method according to claim 1 wherein the fuel of said mixture of fuel and air is hydrogen.

6. The method according to claim 1 wherein the fuel of said mixture of fuel and air is a mixture of hydrogen and a hydrocarbon.

7. A method of operating an internal combustion engine having at least one cylinder, said method comprising the steps of:
   inducting air into the cylinder of said engine,
   compressing said air in a compression stroke inside a combustion chamber,
   a means of adding fuel to said air followed by combustion of the fuel and air mixture in said combustion chamber resulting in a first power stroke of said engine,
   exhausting the combusted mixture of fuel and air into a vaporizer, admitting a first portion of steam from the steam chest of said vaporizer into said combustion chamber from an adjacent steam chamber resulting in a second power stroke, exhausting said first portion of steam into a heat recovery exchanger, admitting a second portion of steam from said steam chest of said vaporizer into said combustion chamber from said adjacent steam chamber resulting in a third power stroke, exhausting said second portion of steam into said heat recovery exchanger.

8. The method according to claim 7 wherein the combustion of said mixture of fuel and air is initiated by a spark inside said combustion chamber.

9. The method according to claim 7 wherein the combustion of said mixture of fuel and air are initiated by compression within said combustion chamber.

10. The method according to claim 7 wherein the fuel of said mixture of fuel and air is a hydrocarbon.

11. The method according to claim 7 wherein the fuel of said mixture of fuel and air is hydrogen.

12. The method according to claim 7 wherein the fuel of said mixture of fuel and air is a mixture of hydrogen and a hydrocarbon.

13. A method of operating an internal combustion engine having at least one cylinder, said method comprising the steps of:

inducting air into the cylinder of said engine, compressing said air in a compression stroke inside a combustion chamber, a means of adding fuel to said air followed by combustion of the fuel and air mixture in said combustion chamber resulting in a first power stroke of said engine, exhausting the combusted mixture of fuel and air into a vaporizer, admitting a first portion of steam from the steam chest of said vaporizer into said combustion chamber from an adjacent primary steam chamber resulting in a second power stroke, exhausting said first portion of steam into a heat recovery exchanger, admitting a second portion of steam from said steam chest of said vaporizer into said combustion chamber from an adjacent secondary steam chamber resulting in a third power stroke, exhausting said second portion of steam into said heat recovery exchanger.

14. The method according to claim 13 wherein the combustion of said mixture of fuel and air is initiated by a spark inside said combustion chamber.

15. The method according to claim 13 wherein the combustion of said mixture of fuel and air are initiated by compression within said combustion chamber.

16. The method according to claim 13 wherein the fuel of said mixture of fuel and air is a hydrocarbon.

17. The method according to claim 13 wherein the fuel of said mixture of fuel and air is hydrogen.

18. The method according to claim 13 wherein the fuel of said mixture of fuel and air is a mixture of hydrogen and a hydrocarbon.

* * * * *